CIRCUIT ARRANGEMENT FOR PRODUCING A CURRENT
HAVING A NON-LINEAR SAWTOOTH
WAVEFORM THROUGH A COIL
Filed Sept. 25, 1959

INVENTORS
peter johannes hubertus janssen
anthonie jannis moggre
BY
[signature]
AGENT United States Patent Office 3,020,484

Patented Feb. 6, 1962

3,020,484

CIRCUIT ARRANGEMENT FOR PRODUCING A CURRENT HAVING A NON-LINEAR SAWTOOTH WAVEFORM THROUGH A COIL

Peter Johannes Hubertus Janssen and Anthonie Jannis Moggre, Eindhoven, Netherlands, assignors to North American Philips Company, Inc., New York, N.Y., a corporation of Delaware Filed Sept. 25, 1959, Ser. No. 842,350
Claims priority, application Netherlands Sept. 30, 1958
6 Claims. (Cl. 328—142)

This invention relates to circuit arrangements for producing a sawtooth waveform current having a non-linear rise time through a coil by means of an amplifier element which is periodically released and the output circuit of which includes a transformer having the said coil coupled to it, at least one capacitor associated with the series booster diode circuit of this circuit arrangement and having a capacitance value such that the current traversing the capacitor develops across it a substantially parabolic voltage, being connected in series with at least one winding of the transformer.

Such arrangements are used inter alia in line deflection circuits of television receivers, in which the non-linear sawtooth waveform current transversing the coil gives rise to a field deflecting the electron beam in the picture tube in a horizontal direction. Such circuit arrangements are important more particularly in the case of picture tubes having large deflection angles, for example 110°, and viewing screens which are slightly curved.

Since in such cases the velocity of deflection of the electron beam requires up to 50% of correction, it is necessary to develop a considerable parabolic voltage. However, such a parabolic voltage in the output circuit of an amplifier element, for which use may be made of a pentode, results in a decreased efficiency of the arrangement. In addition, it is impossible for the voltage developed across the coil to be used directly for suppressing the beam in the picture tube during the line fly-back period.

The circuit arrangement according to the invention obviates these disadvantages and, for this purpose, is characterized in that the transformer comprises at least two windings connected in series with at least two capacitors associated with the series booster diode circuit, the circuit which includes the said coil containing only one of the two capacitors and one of the two windings, and the two capacitors having values such that the currents traversing them develop voltages which are substantially equal, but opposite and substantially parabolic.

In order that the invention may be readily carried into effect, one embodiment will now be described in detail, by way of example, with reference to the accompanying drawing in which.

Figure 1:
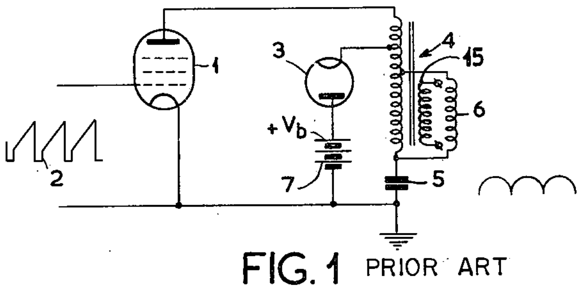
FIG. 1 PRIOR ART
FIG. 1 shows a known circuit arrangement for producing a current having non-linear sawtooth waveform through a coil.

Referring to FIG. 1, tube 1 represents a pentode which is periodically released by a control voltage 2. A non-linear sawtooth wave-form current is passed through a coil 6 by means of tube 1, a series booster diode 3, an auto-transformer 4, and a capacitor 5 associated with the series booster diode circuit.

When the circuit arrangement of FIG. 1 is employed in a television receiver, coil 6 may be the line deflection coil secured to the picture tube (not shown).

If capacitor 5 has a comparatively high value, the current traversing coil 6, as is well-known, has a substantially sawtooth character, since during the first part of the stroke the energy stored in coil 6 causes a charging current to flow to capacitor 5, whereas during the remaining part of the stroke a discharging current flows from the capacitor to the coil. If the capaictor has a high value, the voltage developed across it by the current flowing to and from the capacitor hardly varies. The voltage across capacitor 5, together with the voltage $V_b$ supplied by a voltage source 7, determines what voltage appears across coil 6 during the stroke. If capacitor 5 has a high value, said voltage is substantially constant and a sawtooth current traverses the coil due to the integrating action thereof.

If, however, capacitor 5 has a comparatively low value, the voltage set up across it varies. Assuming that the current traversing coil 6 to a first approximation keeps its sawtooth shape, the voltage set up across capacitor 5 increases quadratically during the flowing of the charging current which is then also sawtooth-shaped, and decreases quadratically during the flowing of the sawtooth discharge current. An approximately parabolic voltage thus appears across capacitor 5 so that the total voltage across coil 6 is constituted by the sum of a constant voltage and a quadratic voltage. These two voltages together yield, after integration by coil 6, the desired more or less non-linear sawtooth waveform current through this coil.

True, this non-linear sawtooth waveform current does not result in a purely parabolic voltage across capacitor 5, but in practice this deviation is negligible. Consequently, reference will always be made hereinafter to the parabolic voltage.

Figure 3:
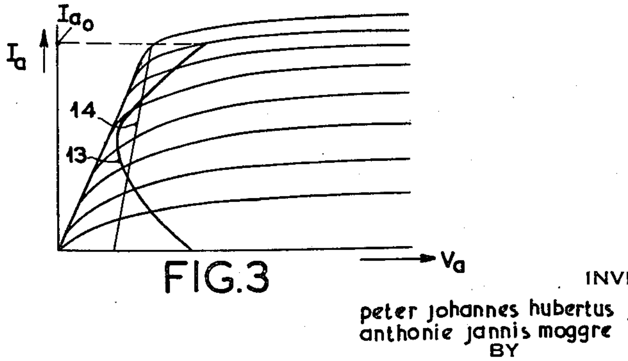
FIG. 3 is a characteristic curve of the amplifying device employed in the circuits of FIGS. 1 and 2, and illustrating the operation conditions of these two circuits.

Set up at the anode of pentode 1 is also a parabolic voltage having its minimum approximately at the centre of the stroke. The work line 13 in the $I_a$—$V_a$ field of charcteristics (see FIG. 3) of this pentode now has a parabolic shape during the stroke. For a substantially constant voltage across capacitor 5, work line 14 would have been a straight line which could approach as much as possible the boundary characteristic of the $I_a$—$V_a$ curves. However, in the case of a parabolic work line 13, at most the top of the parabola can touch the boundary characteristic. The dissipation loss of the pentode is substantially equal to part of the surface between the said work line 13, the $I_a$-axis, the $V_a$-axis and the line parallel to the $V_a$-axis for the maximum anode current $I_{ao}$ occurring. It will be evident that, in the case of a straight work line 14, this surface may be smaller than in the case of parabolic work line 13, so that the efficiency of the circuit in the last-mentioned case is considerably less than that in the first-mentioned case.

A second disadvantage is that the voltage set up across coil 6 cannot be used directly for suppressing the beam current in the picture tube during the fly-back period of the non-linear sawtooth waveform current. True, the video-signal suppresses the beam during the black period, but the voltage supplied by the video-output tube during the black period is often insufficient for suppressing the beam current in the case of a considerable phase difference between the line synchronising signal and the deflection oscillation, as may occur with indirect synchronisation.

In addition, when the fly-back period is lengthened for the purpose of decreasing overscan in picture tubes having a diverging aspect ratio of the viewing screen, the period of suppression of the video-signal is insufficient for suppressing the beam current during the increased fly-back period.

For this reason, in many television receivers, the voltage across coil 6 is applied with the proper polarity to an electrode of the picture tube so that the peak voltage which occurs during the fly-back period can effectively suppress the beam current. This may be achieved, for example, by providing an auxiliary winding 15 (shown in FIG. 1) such that the suppression voltage may be derived from this winding with the proper polarity and amplitude. However, the parabolic voltage is oppositely directed to this peak voltage so that, if such a voltage were applied to the picture tube, the image would be controlled to be brighter at the centre of the screen than at the edges.

This causes difficulty more particularly in 110° deflection tubes wherein considerable correction is required and hence a large parabolic component must be developed.

Figure 2:
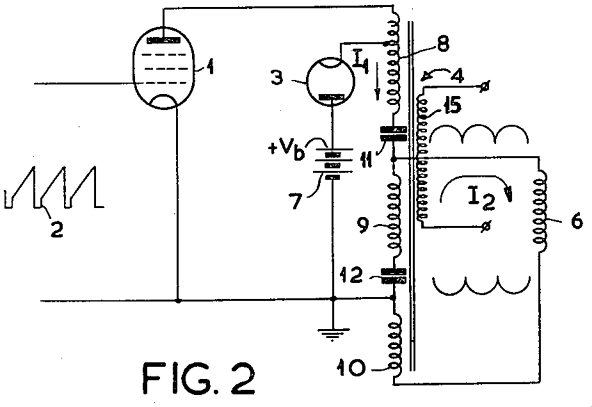
FIG. 2 shows an improved circuit arrangement in accordance with the invention.

These difficulties may be obviated by means of the circuit arrangement according to the invention shown in FIG. 2.

For this purpose, one winding of the transformer 4 of FIG. 1 is divided into three windings 8, 9, 10 and capacitor 5 is divided into two capacitors 11 and 12. Coil 6 is coupled to the circuit constituted by the windings 9, 10 and capacitor 12. The figure also shows the current $I_2$ in the deflection circuit and it appears therefrom that the windings 9 and 10 with respect to winding 8 must be such that the direction of $I_2$ is opposite to that of $I_1$. As before, the values of the capacitors 11 and 12 are chosen sufficiently small for developing a parabolic component across these two capacitors.

Said capacitors must have values such that the currents traversing them develop across the capacitors parabolic voltages which are substantially equal, but of opposite polarities. This implies that the two parabola components in the anode circuit of tube 1 exactly neutralise each other so that the anode voltage is substantially constant during the stroke, as well as the voltage across winding 8. However, a parabola component is set up across capacitor 12, so that the desired non-linear sawtooth waveform current flows through coil 6 after integration by that coil.

The ratio between the capacitances of capacitors 11 ($C_{11}$) and 12 ($C_{12}$) may be calculated as follows:

If the number of turns of the windings 8, 9 and 10 are $n_8$, $n_9$ and $n_{10}$ respectively, the relationship between the currents $I_2$ and $I_1$ is, with some approximation, as follows:

$$\frac{I_2}{I_1}=\frac{n_8+n_9}{n_9+n_{10}}\rightarrow I_2=\frac{n_8+n_9}{n_9+n_{10}}\cdot I_1 \qquad (1)$$

from which it follows:

$$I_2-I_1=I_1\left(\frac{n_8+n_9}{n_9+n_{10}}-1\right) \qquad (2)$$

$I_1$ flows through capacitor 11 and $I_2-I_1$ flows through capacitor 12. Since these currents are oppositely directed, it follows therefrom that:

$$I_2-I_1>0\rightarrow\frac{n_8+n_9}{n_9+n_{10}}>1 \text{ or } n_8>n_{10}$$

so that the number of turns of winding 8 must exceed that of winding 10.

The voltage across capacitor 11 must be equal to that across capacitor 12. True, the currents $I_1$ and $I_2$ are not sinusoidal, but if the voltages are equal for one Fourier component, for example for the fundamental harmonic $f_0$, they are also equal for the other Fourier components and hence also for the sum thereof.

It is thus possible to write:

$$(I_2-I_1)\cdot\frac{1}{j\omega_0C_{12}}=I_1\cdot\frac{1}{j\omega_0C_{11}} \qquad (3)$$

wherein $\omega_0=2\pi f_0$.

Substituting therein the values of Equation 2, we find:

$$\frac{C_{12}}{C_{11}}=\left(\frac{n_8+n_9}{n_9+n_{10}}-1\right) \qquad (4)$$

In FIG. 2, the junction point of capacitor 12 and winding 10 is connected to earth for reasons of symmetry. The supply leads to coil 6 are thus positive and negative with respect to earth during the fly-back, resulting in the total radiation of said supply leads being decreased.

The auxiliary winding 15 for deriving the suppression voltage is fixedly coupled to the coils 8 and 9 of transformer 4. It may thus be ensured that the correct peak voltages occur during the fly-back of the saw-tooth current, but the parabolic voltage is not present during the forward stroke.

However, this is not necessary for the performance of the circuit arrangement according to the invention, so that winding 10 may alternatively be dispensed with. By variation of the value of capacitor 12 it is then necessary again to ensure that the two parabola components exactly neutralise each other. Equation 4 then changes to:

$$\frac{C_{12}}{C_{11}}=\left(\frac{n_8+n_9}{n_9}-1\right)$$

Neither is it necessary for coil 6 to be included in the output circuit of tube 1 in the manner shown in FIG. 2. The main point is only that the deflection circuit includes only one capacitor and that the anode circuit and the booster diode circuit include two capacitors.

If necessary, the number of capacitors may be increased for reasons of symmetry, in which event it is necessary to ensure that the parabola components in the anode circuit and the booster diode circuit neutralise each other and a parabola component always remains in the deflection circuit.

It is not always necessary to use a discharge tube as the control element. As an alternative, use may be made for this purpose of a different element, for example a power transistor. The same remark applies to the booster diode 3: Any unilaterally conductive element which can convey sufficient current may fulfil this switching function.

What is claimed is:

1. A circuit for producing a current having a non-linear sawtooth waveform in a coil comprising an amplifier, and an output circuit connected to said amplifier, said output circuit comprising first and second capacitors alternately serially connected with first and second transformer winding sections, booster diode circuit means comprising a series connected rectifier device and source of voltage connected in parallel with at least a portion of said connected circuit including said first and second capacitors, said coil being connected in parallel with a portion of said serially connected circuit including only one of the said capacitors.

2. The circuit of claim 1, in which said capacitors have values such that the currents traversing them develop voltages thereacross that are substantially equal and opposite and are substantially parabolic.

3. A circuit for producing a current having a non-linear sawtooth waveform through a coil by means of a periodically conductive amplifier device, said circuit comprising an output circuit connected to said amplifier device, said output circuit comprising first and second capacitors alternately serially connected with first and second transformer winding sections, booster diode circuit means comprising a series connected rectifier device and source of voltage connected in parallel with at least the portion of said output circuit including said first and second capacitors, said coil being connected in parallel with a portion of said output circuit that includes said second winding section and only said second capacitor, the ratio of capacitance of said second capacitor to said first capacitor being equal to:

$$\frac{n_8+n_9}{n_9}-1$$

where $n_8$ is the number of turns of said first winding section and $n_9$ is the number of turns of said second winding section.

4. A circuit for producing a current having a non-linear sawtooth waveform through a coil by means of a periodically conductive amplifier device, said circuit comprising an output circuit connected to said amplifier device, said output circuit comprising a series circuit including in the order named a first transformer winding section, a first capacitor, a second transformer winding section, and a second capacitor, booster diode circuit means comprising a series connected rectifier device and source of voltage connected in parallel with at least the portion of said series circuit including said first and second capacitors, said coil being connected in parallel with a portion of said series circuit including said second capacitor and excluding said first capacitor, the ratio of capacitance of said second capacitor to said first capacitor being equal to:

$$\frac{n_8+n_9}{n_9}-1$$

where $n_8$ is the number of turns of said first winging and $n_9$ is the number of turns of said second winding.

5. A circuit for producing a current having a non-linear sawtooth waveform through a coil by means of a periodically conductive amplifier device, said circuit comprising an output circuit connected to said amplifier device, said output circuit comprising a series circuit including in the order named a first transformer winding section, a first capacitor, a second transformer winding section, a second capacitor, and a third transformer winding section, booster diode circuit means comprising a series connected rectifier device and source of voltage connected in parallel with at least the portion of said series circuit including said first and second capacitors, said coil being connected in parallel with the portion of said series circuit including said second and third winding sections and said second capacitor and excluding said first capacitor, the ratio of capacitance of said second capacitor to said first capacitor being equal to:

$$\frac{n_8+n_9}{n_9+n_{10}}-1$$

where $n_8$, $n_9$ and $n_{10}$ are the number of turns of said first, second, and third winding sections, respectively.

6. A circuit for producing a current having a non-linear sawtooth waveform in a coil comprising an electron discharge device having a cathode, a control grid, and an anode, means applying a signal to said grid whereby said device is periodically conductive, a series circuit comprising in the order named a first transformer winding section, a first capacitor, a second transformer winding section, and a second capacitor, means connecting said series circuit between the anode and cathode of said device with said first winding section being connected to said anode, a source of operating potential, booster diode means, said source and diode means being serially connected in parallel with at least the portion of said series circuit including said first and second capacitors, said coil being connected in parallel with the portion of said series circuit including said second capacitor and at least a portion of said second winding section and excluding said first capacitor, said capacitors being proportioned so that, as a result of current flow therethrough, substantially equal and opposite parabolic voltages are developed thereacross, whereby the anode voltage of said device is substantially constant during periods of conduction.

References Cited in the file of this patent

UNITED STATES PATENTS

| | | |
|---|---|---|
| 2,712,616 | Leeds | July 5, 1955 |
| 2,777,089 | Farr | Jan. 8, 1957 |
| 2,830,229 | Sonnenfeldt | Apr. 8, 1958 |
| 2,834,913 | Dietch | May 13, 1958 |
| 2,871,405 | Vonderschmitt | Jan. 27, 1959 |
| 2,903,621 | Moore | Sept. 8, 1959 |